United States Patent [19]
Livingstone et al.

[11] 3,822,909
[45] July 9, 1974

[54] BUMPER STRIP

[75] Inventors: Seabourn S. Livingstone, Grosse Pointe Farms; Herbert H. Hillman, Marysville, both of Mich.

[73] Assignee: St. Clair Rubber Company, Marysville, Mich.

[22] Filed: Aug. 28, 1973

[21] Appl. No.: 392,193

[52] U.S. Cl. .................... 293/71 R, 293/88, 293/99
[51] Int. Cl. ...................... B60r 19/06, B60r 19/08
[58] Field of Search .......... 293/71 R, 87, 88, 98, 99

[56] References Cited
UNITED STATES PATENTS

| | | | |
|---|---|---|---|
| 2,967,324 | 1/1961 | Gagnier | 293/99 UX |
| 2,993,722 | 7/1961 | Borah | 293/71 R |
| 3,291,516 | 12/1966 | Kavos | 293/87 X |
| 3,441,305 | 4/1969 | Trammell | 293/71 R X |
| 3,680,903 | 8/1972 | Hulten | 293/71 R |

Primary Examiner—Robert S. Ward, Jr.
Attorney, Agent, or Firm—Harness, Dickey & Pierce

[57] ABSTRACT

An impact-absorbing bumper comprised of a strip composed of a resilient material and a plurality of fasteners embedded at spaced intervals therealong which project outwardly of the rear mounting face of the strip. Each fastener is comprised of a plurality of outwardly projecting engaging legs which are biased in a mutually separating direction and into interlocking engagement with the edges of an aperture provided in a mounting plate on which the bumper strip is to be installed. The separating bias on the engaging legs of each fastener is primarily achieved by an integrally formed rearwardly projecing portion of the resilient material which extends between the inner surfaces of the engaging legs, thereby preventing inadvertent disengagement of the fasteners from the mounting plate as a result of shocks and vibrations.

10 Claims, 9 Drawing Figures

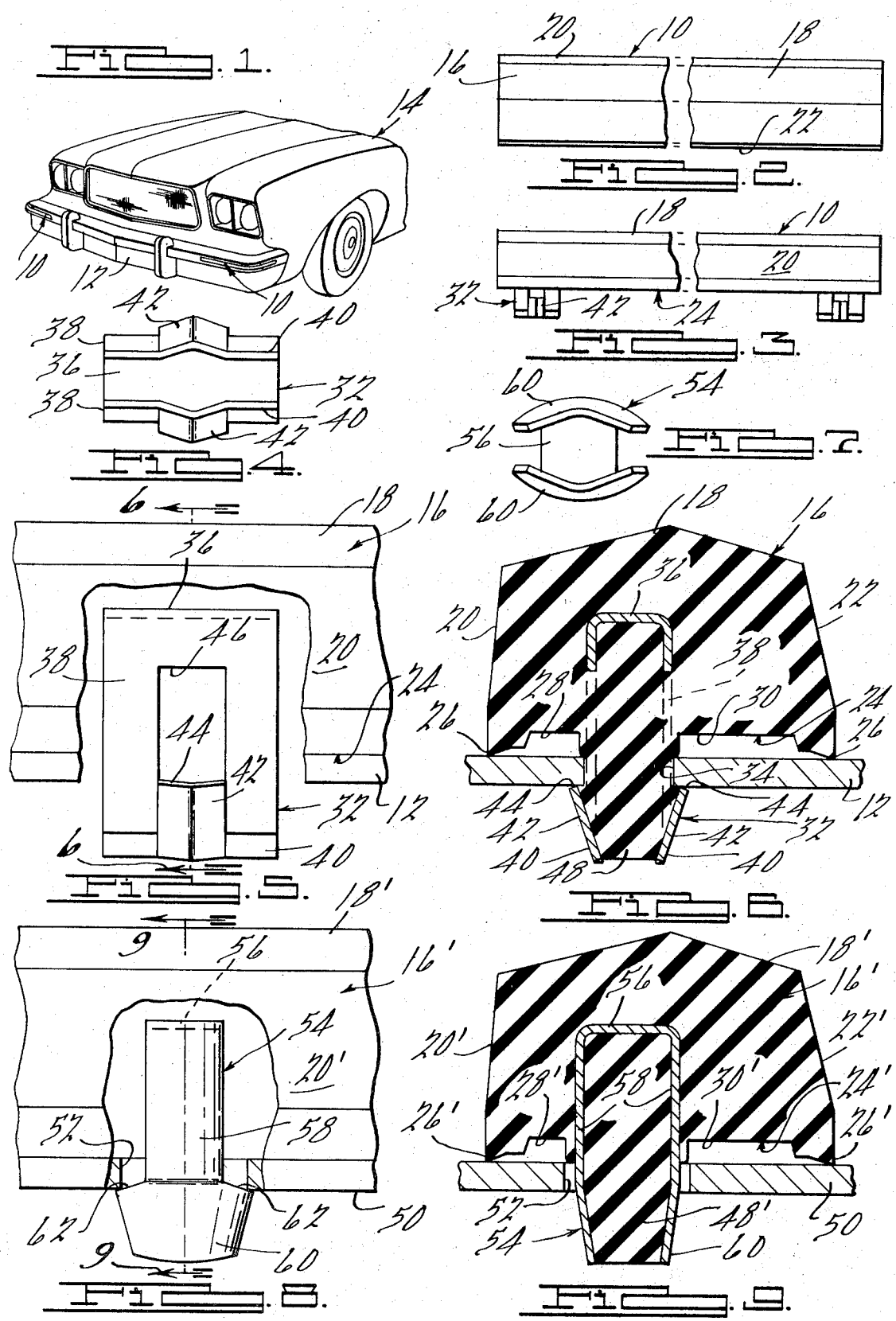

BUMPER STRIP

BACKGROUND OF THE INVENTION

The present invention is particularly applicable but not necessarily restricted to impact and abrasion-resistant strips of the type which are adapted to be secured to the outer faces of the face bar of automobile bumper assemblies. The provision of such impact-absorbing strips minimizes damage to the face bar and associated components as a result of moderate impacts which frequently occur during the parking of a vehicle. Conventionally, such bumper strips are positioned along the crest of the bumper face bar and along the forward edges of any vertical bumper guards that may be incorporated therealong.

A variety of techniques have heretofore been used or proposed for affixing such bumper strips to the bumper face bar of vehicles, including the use of adhesives, screws, spring-type fasteners and bolts. The use of various adhesives has heretofore proven unsatisfactory in many instances due to a progressive deterioration of the adhesive bond or a bond rupture due to impact, resulting in the separation of sections of the bumper strip from the face bar. The use of fastening bolts has proven satisfactory in most instances, but generally necessitate at least a partial disassembly of the vehicle in order to gain access to the rear surfaces thereof for securing the strip along sections which normally are inaccessible to conventional hand tools. Such techniques, while having proved successful during the assembly operations of a new vehicle, have been found impractical for the installation of such bumper strips in the field. Spring-type fasteners of the type heretofore known, while providing increased ease of installation, are more susceptible to becoming loosened during use and have been known to become disengaged with the bumper face bar as a result of vibrations and shock loadings.

The present invention overcomes the problems and disadvantages associated with bumper strip assemblies of the types heretofore known by providing a simple and economical assembly which can be readily installed in the field by providing appropriate apertures in the plate on which the bumper strip is to be mounted and which fastening devices firmly interlock the bumper strip assembly to the face bar, avoiding inadvertent disengagement.

SUMMARY OF THE INVENTION

The benefits and advantages of the present invention are achieved by an impact-absorbing bumper assembly consisting essentially of a resilient body section formed to define an impact face and a mounting face. At least one fastener is disposed in embedded interlocked relationship in the resilient body section and is formed with a plurality of engaging legs projecting outwardly of the mounting face thereof. Each fastener is provided with engaging means on the engaging legs which are adapted to engage the edges of an aperture of a mounting member on which the bumper assembly is to be installed. The deflectable engaging legs of each fastener are biased in a mutually divergent relationship by means of an integrally formed portion of the body section which extends between the engaging legs urging them into firm engaging relationship with the mounting member in spite of vibrations and shock loading applied to the bumper assembly.

Additional benefits and advantages of the present invention will become apparent upon a reading of the description of the preferred embodiments taken in conjunction with the accompanying drawing.

BRIEF DESCRIPTION OF THE DRAWING

FIG. 1 is a fragmentary perspective view of the front end portion of a typical vehicle incorporating impact-absorbing bumper strips on the forward and side portions of the bumper face bar thereof;

FIG. 2 is a fragmentary front elevational view of the impact face of a typical bumper strip assembly;

FIG. 3 is a plan view of the bumper strip assembly shown in FIG. 2 illustrating fasteners projecting outwardly of the mounting face thereof;

FIG. 4 is a magnified end elevational view of a fastener constructed in accordance with one of the embodiments of the present invention;

FIG. 5 is a magnified fragmentary plan view with portions thereof broken away for clarity illustrating a bumper strip assembly and a fastener of the type shown in FIG. 4 in an installed position within a slotted aperture of a bumper face bar;

FIG. 6 is a transverse sectional view of the bumper assembly and bumper face bar shown in FIG. 5, and taken substantially along the line 6—6 thereof;

FIG. 7 is a magnified end elevational view of a circular-type fastener constructed in accordance with an alternative satisfactory embodiment of the present invention;

FIG. 8 is a magnified fragmentary plan view with portions broken away for clarity illustrating the fastener as shown in FIG. 7 embedded in a bumper strip body and disposed in installed relationship within a circular aperture of a typical mounting member; and FIG. 9 is a transverse sectional view of the bumper strip assembly in the installed position as shown in FIG. 8 and taken substantially along the line 9—9 thereof.

DESCRIPTION OF THE PREFERRED EMBODIMENTS

Referring now in detail to the drawings and as may be best seen in FIG. 1, a pair of resilient bumper strip assemblies 10 are shown which are affixed to the forward outer portions of a bumper face bar 12 of an automobile 14 and extend around the side edges of the face bar terminating at points spaced from the rear edges thereof. The foregoing installation is typical of the many uses of the bumper strip which can be fabricated in any desired length and in any one of a variety of cross sectional configurations consistent with the intended end use thereof.

As shown in FIGS. 2–6, the bumper strip 10 consists of an elongated body section 16 which is comprised of a resilient deformable material, such as rubber or other suitable elastomeric materials. The body section 16 is of a generally outwardly tapered cross sectional configuration having a V-shaped impact face indicated at 18 and tapered side faces 20, 22. The rear surface of the body section is formed with a mounting face 24 having sealing edges 26 extending along the side edges thereof for engaging the surface of a mounting plate, such as the bumper face bar 12, in a manner to produce a smooth, conforming fit and to prevent entry of dirt and other contaminating substances beneath the mounting face. The mounting face is also provided with two longitudinally extending depressions 28, 30, providing a degree of concavity which enhances the cushioning characteristics of the resilient strip and also facilitates installation and an engagement of fasteners 32 in slotted apertures 34 provided in the face bar 12.

The fastener 32, as best seen in FIGS. 4–6, is of a generally U-shaped configuration and is disposed in embedded interlocked relationship in the elastomeric material of which the body section 16 is composed. The fastener 32 consists of a U-shaped bight section 34 having a pair of deflectable engaging legs 38 integrally affixed to and extending therefrom in spaced substantially parallel relationship. The engaging legs 38 project outwardly of the mounting face 24 of the body section and the outer end faces thereof are provided with inwardly bent sections, indicated at 40, providing a taper for facilitating alignment of the fastener with the edges of the slotted aperture 34 in the mounting member. Each engaging leg is provided with an integrally formed rectangularly-shaped outwardly displaced tang 42 which is of a V-shaped or convex cross sectional configuration forming an inwardly directed engaging edge 44 which is adapted to be disposed in firm engaging and interlocking relationship against the inner surface of the bumper face bar 12, preventing an extraction of the fastener when in the installed position as best seen in FIG. 6. The central portion of each engaging leg 38 disposed inwardly of the tang 42 is formed with a generally rectangular-shaped slot or aperture 46.

It will be apparent from the arrangement as illustrated in FIGS. 2–6 that a bumper strip assembly in accordance with one of the embodiments of the present invention embodies a plurality of the fasteners 32 disposed at spaced intervals along the mounting face of an elongated resilient body section 16 and which fasteners are adapted to be positioned within elongated shaped slots 34 provided in the member on which the bumper strip is to be mounted. The generally concave configuration of the mounting face in relationship to the position of the engaging edges 44 on the fasteners is controlled os that the resilient body section is distorted during installation to apply a continuing outward pull on the fastener, thereby maintaining a continuing pressure of the engaging edge 44 against the rearward face of the bumper face bar. This relationship also assures proper engagement in spite of minor variations in the thickness of the bumper face bar or the presence of any burs or other obstructions defining the border of the slot.

In addition to the outward biasing pull of the resilient body section 16 on the fastener 32, a continuing biasing force is applied to the engaging legs 38 tending to move them in a divergent or separating direction by means of an integrally formed section 48 of the resilient material which projects outwardly of the mounting face and between the inner surfaces of the engaging legs as best shown in FIG. 6. The divergent or separating biasing force applied by the integral section 48 is supplemented by the resiliency of the engaging legs, which preferably are comprised of a stainless steel or a spring steel provided with a corrosion inhibiting protective surface coating, such as a zinc phosphate coating, for example.

It will be appreciated that upon installation of the bumper strip assembly, the outer faces of the tangs 42 are positioned in sliding coaction with the inner edges of the slot 34, causing an inward deflection of the engaging legs and causing a lateral extrusion of some of the resilient integral section 48 to permit a reduction in the thickness of the fastener to enable entry into the slot. When the engaging edges 44 of the tangs pass beyond the rear surface of the bumper face bar, the inherent resiliency of the metal of which the engaging legs are comprised and the bias applied by the deformed integral section 48 serves to move the legs in separating relationship to the position as shown in FIG. 6 and to retain the legs in such position in spite of jars and impacts and vibrations encountered in normal car handling.

In addition to the fastener embodiment as previously described in connection with FIGS. 4–6, which is applicable for use on mounting members formed with slotted apertures, such as the aperture 34 therethrough, an alternative satisfactory embodiment of a fastener is illustrated in FIGS. 7–9 which is applicable for use on a mounting member 50 having a circular aperture 52 therethrough. The resilient body section of the bumper strip assembly shown in FIGS. 7–9 is the same as that previously described and like parts are indicated by like numerals with a prime affixed thereto.

As best seen in FIGS. 7–9, a circular-type fastener 54 is of a generally U-shaped configuration including a bight portion 56 integrally connected to two engaging legs 58 which are disposed in spaced substantially parallel relationship and which terminate at their outer projecting ends in arcuate-shaped members 60. The arcuate-shaped members 60 in the normal nondeflected condition define a generally eliptical contour, as best seen in FIG. 7, but are adapted to deflect during the course of the insertion of the fastener into the circular aperture 52 assuming a conforming arcuate contour. Upon passing beyond the inner surface of the mounting member 50, the arcuate-shaped members again assume the configuration as illustrated in FIGS. 7–9, whereby the inner engaging edges 62 thereof overlie and firmly engage the adjacent edge portion of the aperture 52. As will further be apparent from FIGS. 7–9, the arcuate-shaped members 60 are formed with a gradual taper to facilitate an alignment of the fastener and an insertion thereof through the mounting aperture in the bumper face bar.

The fastener 54 is retained in firm interlocking relationship within the aperture of the mounting member by the combined outward biasing force of the deformed body section 16', as well as by the separating or divergent biasing force of the integral section 48' positioned between the engaging legs 58 and as further supplemented by the inherent resiliency of the metal of which the fastener 54 is comprised.

While it will be apparent that the invention herein disclosed is well calculated to achieve the benefits and advantages hereinabove set forth, it will be appreciated that the invention is susceptible to modification, variation and change without departing from the spirit thereof.

What is claimed is:

1. An impact-absorbing bumper assembly comprising a body section composed of a resilient material and defining an impact face and a mounting face, and at least one fastener embedded in said body and projecting outwardly of the mounting face thereof, each said fastener formed with a plurality of longitudinally extending deflectable engaging legs incorporating engaging means thereon adapted to engage the edges of an aperture of a mounting member on which said bumper assembly is to be mounted, and biasing means including a section of said body disposed between said engaging legs for biasing said legs in mutual divergent separating relationship.

2. The bumper assembly as defined in claim 1, wherein said body is in the form of an elongated strip and a plurality of fasteners are embedded in longitudinally spaced intervals along said mounting face thereof.

3. The bumper assembly as defined in claim 1, wherein said section of said body member disposed between said engaging legs extends to a position substantially adjacent to the outer projecting ends of said legs.

4. The bumper assembly as defined in claim 1, wherein said fastener is of a generally U-shaped configuration with the bight section thereof embedded and interlocked in said body.

5. The bumper assembly as defined in claim 1, wherein said resilient material comprises a deformable elastomer and said fastener is composed of steel.

6. The bumper assembly as defined in claim 1, wherein each said fastener is comprised of a pair of said engaging legs which extend in spaced substantially parallel relationship.

7. The bumper assembly as defined in claim 1, wherein said engaging means comprises an engaging tang integrally formed with said engaging leg and projecting outwardly of the plane thereof, said tang having an engaging edge oriented towards said mounting face for engaging the rear face of a mounting member when in an installed position.

8. The bumper assembly as defined in claim 7, wherein the outer end portions of said engaging legs are formed with a converging taper to facilitate entry of the end of said fastener in a receiving aperture.

9. The bumper assembly as defined in claim 1, wherein each said fastener is comprised of a pair of said engaging legs disposed in spaced longitudinally extending relationship, at least the outer end portions of said engaging legs formed with an arcuate contour providing a generally circular cylindrical configuration to said outer end portions for facilitating insertion thereof into a circular aperture provided in a mounting member.

10. The bumper assembly as defined in claim 9, wherein said outer end portions are of an enlarged transverse width in comparison to the inner portions of said legs forming an angularly extending engaging edge defining said engaging means.

* * * * *